(12) United States Patent
Chen et al.

(10) Patent No.: US 11,023,449 B2
(45) Date of Patent: Jun. 1, 2021

(54) METHOD AND SYSTEM TO SEARCH LOGS THAT CONTAIN A MASSIVE NUMBER OF ENTRIES

(71) Applicant: EMC IP Holding Company LLC, Hopkinton, MA (US)

(72) Inventors: Kai Chen, Shanghai (CN); Lingda Tang, Shanghai (CN); Michael John Dutch, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 987 days.

(21) Appl. No.: 14/576,921

(22) Filed: Dec. 19, 2014

(65) Prior Publication Data
US 2016/0179866 A1 Jun. 23, 2016

(51) Int. Cl.
*G06F 16/30* (2019.01)
*G06F 16/23* (2019.01)
*G06F 16/38* (2019.01)

(52) U.S. Cl.
CPC .......... *G06F 16/2358* (2019.01); *G06F 16/38* (2019.01)

(58) Field of Classification Search
CPC ......... G06F 17/30368; G06F 17/30722; G06F 16/2358
USPC ....................................................... 707/700
See application file for complete search history.

(56) References Cited

U.S. PATENT DOCUMENTS

| | | | | |
|---|---|---|---|---|
| 5,463,768 A | * | 10/1995 | Cuddihy | G06F 11/2205 714/37 |
| 7,793,151 B2 | * | 9/2010 | Miller | G06F 11/0709 714/26 |
| 8,656,478 B1 | * | 2/2014 | Forristal | H04L 63/20 726/11 |
| 8,776,240 B1 | * | 7/2014 | Wu | G06F 21/567 726/22 |
| 8,874,610 B2 | | 10/2014 | Geroulo | |
| 2004/0030703 A1 | * | 2/2004 | Bourbonnais | G06F 17/30377 |
| 2004/0254919 A1 | * | 12/2004 | Giuseppini | G06F 16/903 |
| 2005/0015624 A1 | * | 1/2005 | Ginter | H04L 63/20 726/4 |
| 2005/0038818 A1 | * | 2/2005 | Hooks | G06F 11/079 |
| 2006/0184529 A1 | | 8/2006 | Berg et al. | |
| 2010/0024037 A1 | * | 1/2010 | Grzymala-Busse | G06F 21/6245 726/26 |
| 2011/0040983 A1 | | 2/2011 | Grzymala-Busse | |
| 2012/0297486 A1 | * | 11/2012 | Turbin | G06F 21/562 726/24 |
| 2014/0310225 A1 | | 10/2014 | Huang et al. | |
| 2015/0326588 A1 | * | 11/2015 | Vissamsetty | H04L 63/1491 726/23 |

\* cited by examiner

*Primary Examiner* — Manesh H Dwivedi
(74) *Attorney, Agent, or Firm* — Chamberlain, Hrdlicka, White, Williams & Aughtry

(57) ABSTRACT

Techniques to search logs that contain a massive number of entries are disclosed. In various embodiments, logs are pre-scanned incrementally to identify logs of interest. A log is identified as a log of interest based at least in part on a determination that the log satisfies a symptom definition associated with a symptom. A symptom pre-scan result is generated for those logs of interest that satisfy the symptom definition. The symptom pre-scan result is stored in a searchable pre-scan result data store.

27 Claims, 8 Drawing Sheets

600 ⤹

| Description | Symptom Data | | Symptom Pattern |
| --- | --- | --- | --- |
| | Min | Max | Time Scope |
| File rename source path | ddfs.info | | \<reg ex to capture name of source directory\> |
| | 1 | | None ▼ |

| Description | Symptom Data | | Symptom Pattern | |
| --- | --- | --- | --- | --- |
| | Min | Max | Time Scope | |
| Rename count exceeds threshold | ddfs.info | | \<reg ex using placeholder string $1 to detect renames\> | |
| | 10 | | 5 | Minute(s) ▼ |
| | String | Substitution | | |
| | $1 | Reference ▼ | \<symptom #\> | Mapping ▼ |

METHOD AND SYSTEM TO SEARCH LOGS THAT CONTAIN A MASSIVE NUMBER OF ENTRIES

BACKGROUND OF THE INVENTION

In an IT environment, most devices generate logs every day. These logs are very important for operations, statistics, troubleshooting and other management work. In general, log entries are unstructured data. To facilitate these tasks it is a common practice to parse the unstructured logs and store valuable information into a repository. However, when managing a big IT environment, like a global company, or providing cloud services to a large number of customers, the log volume could be huge. Finding information of interest from within tens of billions of records is a difficult and time consuming task.

BRIEF DESCRIPTION OF THE DRAWINGS

Various embodiments of the invention are disclosed in the following detailed description and the accompanying drawings.

FIGS. 6A and 6B illustrate an example of symptoms such as may be referred to in a bug definition.

DETAILED DESCRIPTION

Figure 1:
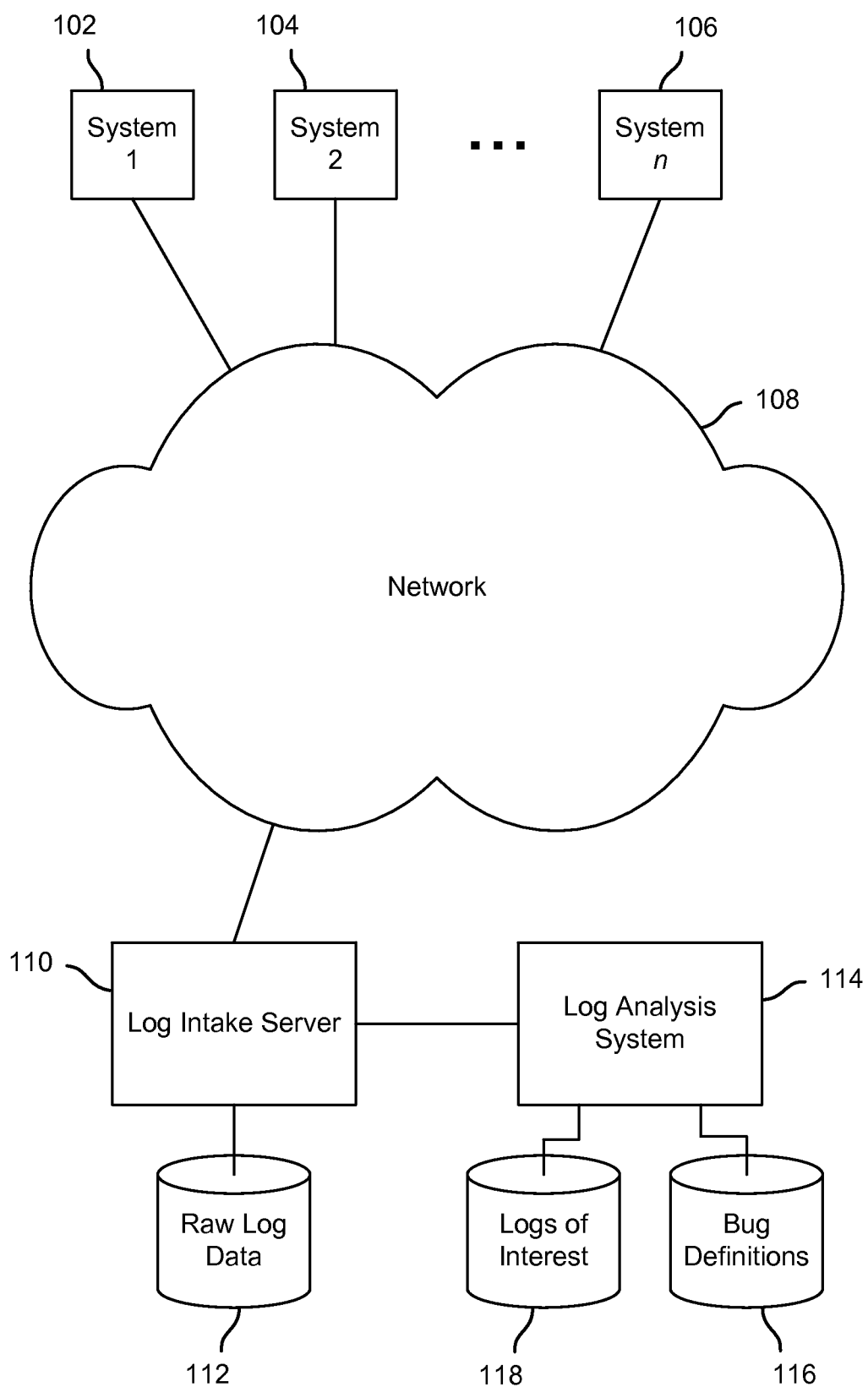
FIG. 1 is a block diagram illustrating an embodiment of a system to pre-scan logs.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Pre-scanning logs received from an installed base of systems (e.g., hardware, software, combinations thereof, etc.) to identify symptom matches prior to log scan or search time is disclosed. In various embodiments, logs may be pre-scanned as the logs are received and/or in batches on logs that have been received since a most recently pre-scanned log (incremental pre-scan). Pre-scanning in various embodiments may include finding symptom matches in logs as they are pre-scanned and storing data associated with such matches and/or the logs in which the matches were found in a repository or other data and/or knowledge store. In various embodiments, symptoms may be pattern-based, comparison-based, or otherwise defined. At scan/search time, a search query may be constructed, e.g., referencing one or more symptoms and/or sets of symptoms, and pre-scanned logs in which matches for such symptoms have been found and/or associated pre-scan result data may be used to find and return logs responsive to the search query.

Typically, a log is a set of text output, which is generated by systems automatically, organized in files or commend line. A log typically includes a set of log entries ordered by timestamp. A log entry may include one or multiple lines next to each other in a log, which identifies an event. A log entry typically includes a timestamp and an unstructured message. The unstructured message is not constrained to be full text format, but can also be presented as a number, date, hyperlink, etc.

Techniques to locate a set of log entries that are of interest, so they can be processed further, are disclosed. In various embodiments, symptoms and symptom sets may be defined and used to specify the information of interest within a log. In various embodiments, symptoms may be pattern-based, comparison-based, or otherwise defined.

A pattern may identify the messages of interest. In various embodiments, patterns may be specified using one or more of several methods, including without limitation regular expressions. Regular expressions may be an effective method of searching log entries. For example, the pattern "^.*([1-9][0-9]{3,}) opaque entries.*$" means the number of opaque entries is greater than or equal to 1000 (assuming there are no digit separators in the message).

A basic symptom may be composed of a pattern and (optionally) frequency (number of occurrences) constraints within a certain period. A simple symptom may be defined by a pattern and doesn't have any frequency constraint. Once a log entry matches the pattern, that symptom is met. A more complex symptom may include a frequency constraint, such as a number of occurrences within a certain period. For example, 5 or more matches in 5 minutes of a pattern such as "Command timeout.*? chnl/tgt/lun (\d+?  ̂\d+?  ̂\d+?).*? No retry". Other examples of frequency constraints include: occur exactly once in a certain period ([1,1]); occur more than twice in a certain period ([2,+∞)); etc.

An advanced pattern-based symptom may be defined with substitutions that reference other symptoms. For example, an advanced symptom A may be defined as "$1: leave", where "$1" is the substitution of the first match of symptom B "(ioc\d+): enter". With substitution, these two symptoms are associated. In the example above, symptom A and symptom B can be used as a pair of "enter" and "leave" of a same device, e.g., an "I/O controller" ("ioc") have a same device identifier "d".

A comparison-based symptom may be defined. For example, a comparison-based symptom may be defined with reference to a start time associated with a start event, e.g., the start of an operation, an end time associated with an ending event, e.g., the same operation ending, and a comparison between the amount of time that elapsed between the start time and end time and a detection threshold. For example, in various embodiments, a start event may be detected in pre-scanning, e.g., based on a pattern match, and a pre-scan result that includes a timestamp of the event stored. Subsequently, pre-scanning may detect the corresponding ending event and capture the observed end time. An observed elapsed time may be computing based on the pre-scan results, and if the time computed to have elapse between the start and end events exceeded a maximum (detection threshold) amount of time, the comparison-based symptom may be determined to have been detected/matched and a corresponding pre-scan result may be generated and stored.

In various embodiments, a symptom set may be defined to include one or multiple symptoms which concatenated with logic operation and time constraint.

FIG. 1 is a block diagram illustrating an embodiment of a system to pre-scan logs. In the example shown, a plurality of systems comprising an installed base of systems, represented in FIG. 1 by systems 102, 104, and 106, generate logs (e.g., daily logs) and send them via network 108 to a log intake server 110, which stores the received logs in a raw log storage 112. For example, log intake server 110 and raw log data storage 112 may be associated with a support center or similar organization and/or infrastructure associated with providing technical support to users of systems 102, 104, and 106, and/or analyzing log data to identify and remediate bugs or other issues with systems such as system 102, 104, and 106. In the example shown, a log analysis system 114 is configured to analyze logs received by log intake server 110. In various embodiments, log analysis system 114 may pre-scan logs, e.g., as they are received, incrementally in batches, etc., to identify symptom matches. Pattern-based, comparison based, and/or other symptoms associated with bug definitions may be stored in bug definition store 116 and used to perform the pre-scan. Logs and/or portions thereof in which symptom matches are found during pre-scanning may be stored in a "logs of interest" data store 118. Data store 118 may in various embodiments include one or more database tables and/or partitions thereof and may be stored on an enterprise content management system or other repository.

Figure 2:
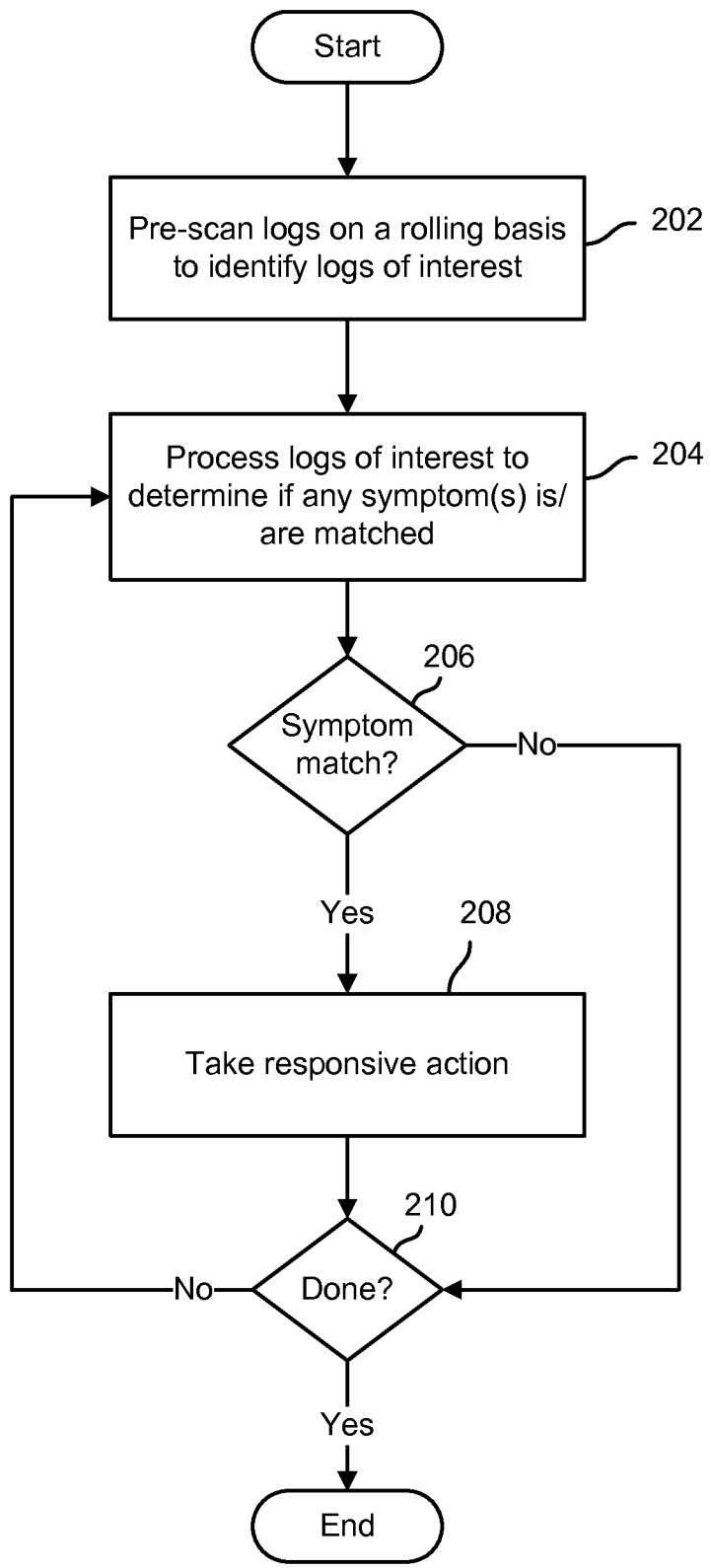
FIG. 2 is a flow chart illustrating an embodiment of a process to pre-scan logs.

FIG. 2 is a flow chart illustrating an embodiment of a process to pre-scan logs. In various embodiments, the process of FIG. 2 may be implemented by a log analysis system, such as log analysis system 114 of FIG. 1. In the example shown, logs are pre-scanned on a rolling (or batched or other incremental) basis to identify logs of interest (202). For example, pattern matching may be used to identify logs of interest. The logs of interest are processed to determine if any symptom(s) is/are matched (204). For example, a symptom may be defined to be matched upon detection of a prescribed number of occurrences of a given pattern within a prescribed period of time; or, in the case of a comparison-based symptom, a comparison may be made between and observed and/or computed value and a corresponding threshold. Logs determined to be of interest as a result of matches to a pattern having been detected may be processed further to compare the number and/or frequency of occurrences of the pattern to the symptom definition. If a symptom match is found (206), responsive action is taken (208). For example, a symptom pre-scan result may be stored, e.g., for later use to respond to search queries associated with the symptom. Pre-scanning continues for logs that have not yet been pre-scanned (210), until all logs have been processed.

Figure 3:
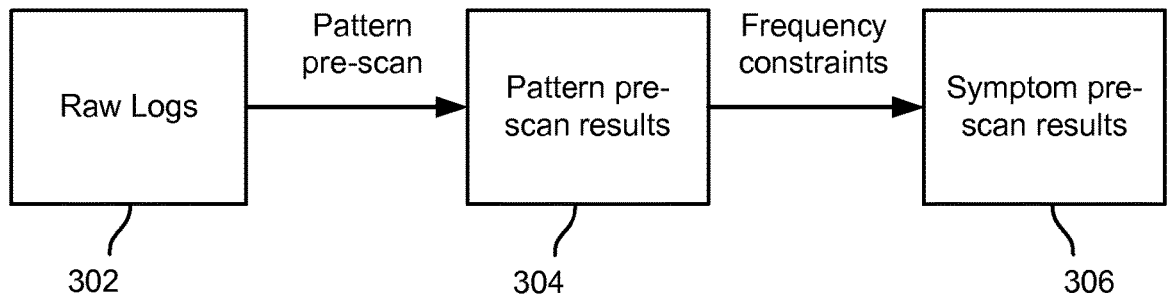
FIG. 3 is a block diagram illustrating an embodiment of a system and process to pre-scan logs.

FIG. 3 is a block diagram illustrating an embodiment of a system and process to pre-scan logs. In the example shown, pattern pre-scan processing is performed with respect to raw logs 302, yielding pattern pre-scan results 304. Pattern pre-scan results 304 may include one or more database entries identifying a log in which a pattern match has been found (e.g., log of interest), the pattern that was matched, etc. The pattern pre-scan results 304 are used to identify, e.g., through further pre-scanning, logs of interest in which frequency constraints were satisfied (e.g., prescribed number of occurrences of a given pattern match within a prescribed period of time), and to generate and store symptom pre-scan results 306.

Figure 4:
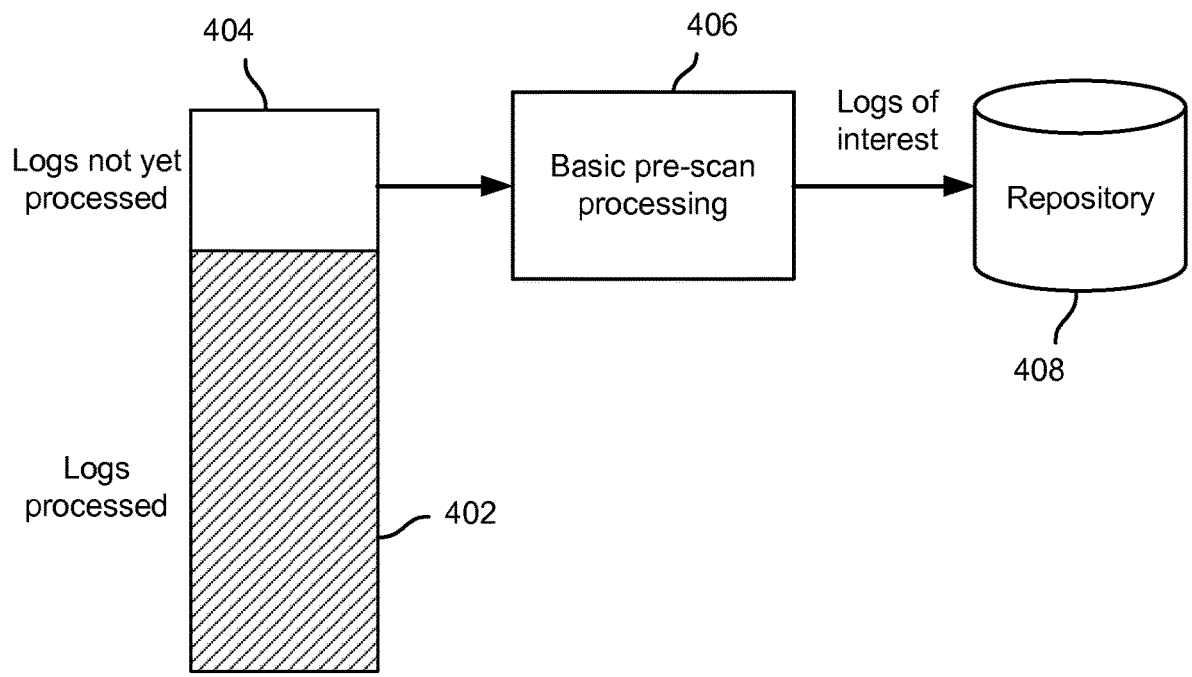
FIG. 4 is a block diagram illustrating an embodiment of a system to perform basic pre-scan processing.

FIG. 4 is a block diagram illustrating an embodiment of a system to perform basic pre-scan processing. In the example shown, a set of raw log data includes logs that have already been pre-scanned 402 and logs that have not yet been pre-scanned 404. A pointer or other data structure, entity, or construct (not shown) may be used to keep track of which logs have been pre-scanned (402) and which have not (404). Basic pre-scan processing 406 (e.g., basic pattern matching, performing basic comparisons between observed/computed values and corresponding thresholds, etc.) is performed with respect to logs that have not yet been pre-scanned 404. Logs of interest and/or associated metadata are stored in a repository 408, e.g., in one or more database tables and/or partitions thereof. In various embodiments, once pre-scan processing has been performed with respect to a log, the log may not be scanned further. Instead, pre-scan results associated with the log (if any) may be used, along with other pre-scan results to respond to scan requests and/or other search queries, as described more fully below.

In various embodiments, a symptom may be defined at least in part by reference (e.g., one or more hierarchical references) to one or more other symptoms, from which the former symptom may be said to depend.

Figure 5A:
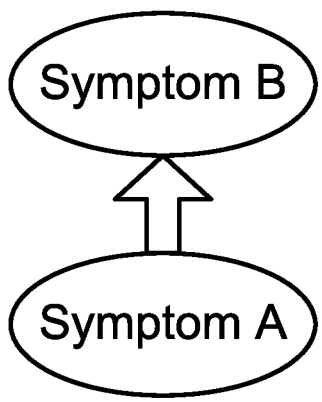
FIG. 5A is a block diagram illustrating an example of a symptom that references another symptom.

FIG. 5A is a block diagram illustrating an example of a symptom that references another symptom. In the example shown, Symptom A includes a reference to Symptom B, e.g., in a definition of Symptom A. For example, one or more criteria specified in a definition of Symptom A may refer to an occurrence of Symptom B and/or to one or more data fields, data values, and/or other data associated with an occurrence of Symptom B. For example, a Symptom A associated with a certain process, action, event, etc. ending may reference a Symptom B a corresponding occurrence of which may be identified by reference to data values associated with the corresponding occurrence, e.g., a process or other identifier, a port number, a device or other entity identifier, etc.

Figure 5B:
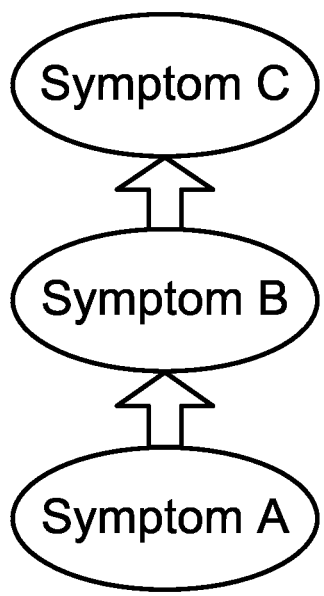
FIG. 5B is a block diagram illustrating an example of multiple, hierarchical references between symptoms.

FIG. 5B is a block diagram illustrating an example of multiple, hierarchical references between symptoms. In the example shown, Symptom A references Symptom B, which in turn references Symptom C. For Symptom A to be matched, a corresponding occurrence of Symptom B may be required, which in turn may only be found to occur if a corresponding occurrence of Symptom C had been found.

Figure 5C:
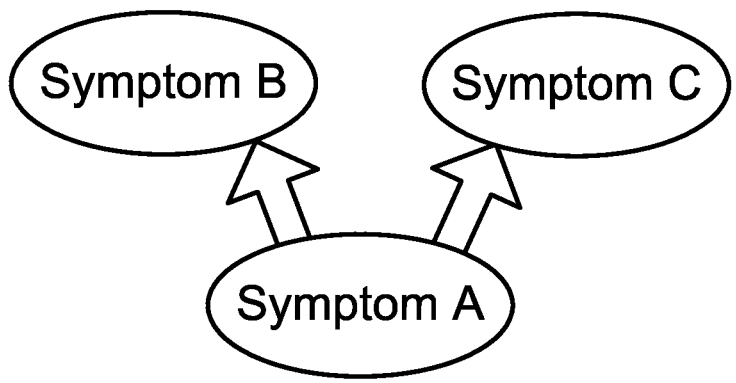
FIG. 5C is a block diagram illustrating an example in which a symptom references multiple other symptoms.

FIG. 5C is a block diagram illustrating an example in which a symptom references multiple other symptoms. In the example shown, Symptom A references Symptom B and Symptom C directly. For Symptom A to be matched, e.g., it may be necessary for corresponding occurrences of Symptom B and Symptom C to have been found. In various embodiments, one or more attributes of an occurrence of Symptom A may be derived from data values associated with one or both of Symptom B and Symptom C, e.g., data values specified in a definition of Symptom A.

In various embodiments, a "bug" may include anything that can be identified and remediated. A "bug" or other remediable problem definition may specify the hardware models and software versions that are exposed to a bug and the symptom(s) that precisely identify it. Multiple symptoms that must occur in a particular order and time period may be specified. In some embodiments, the result of testing a bug definition is true or false; if true, the matching bug signature (i.e., that part of the symptom data that uniquely identifies the occurrence of a bug) may be provided as proof.

In some embodiments, a symptom may be anything that can be detected with a Boolean operation, such as a pattern match or a comparison. Depending on the symptom definition, the Boolean operation may need to be successful a specified number of times (min to max) within a specified period (time scope) in order for the entire symptom definition to test as true. In some embodiments, the same symptom may be referenced by multiple bugs.

In some embodiments, a pattern-based symptom may be used to define a bug. A pattern may be specified as a regular expression. A symptom may reference a portion matched by another symptom to specify its pattern.

In some embodiments, a bug definition may be used to identify products based on their attributes or behavior.

FIGS. 6A and 6B illustrate an example of symptoms such as may be referred to in a bug definition. For example, a bug definition may be created for a problem associated with a backup (or other) application that performs "too many" renames within the same source directory on a target storage system. FIG. 6A is a block diagram showing elements of a symptom definition of a symptom used to capture a name of a source directory. FIG. 6B is a block diagram showing elements of a symptom definition of a symptom used to detect that a rename threshold has been exceeded with respect to a source directory associated with an occurrence of the symptom defined in FIG. 6A.

In various embodiments, every symptom is identified by a unique identifier automatically generated by a support system, such as a system configured to provide a bug definition tool or other interface and to receive and store bug definitions. When referenced within a bug definition the symptom description is appended to the identifier. In some embodiments, the same symptom may be referenced by different bugs. In the same manner that different illnesses (e.g., a cold, strep throat, and tonsillitis) exhibit a common symptom (e.g., a sore throat), multiple bug definitions may share common symptom definitions.

In some embodiments, a bug definition may reference directly a symptom that itself references one or more other symptoms. In such a case, the bug definition may require two or more symptom definitions even though only one is explicitly referenced.

Referring to the examples shown in FIG. 6A, the symptom definition 600 includes a description 602 and a "symptom data" field 604, in which a log to be scanned for matches to the symptom definition is specified, in this example a log named "ddfs.info". In some embodiments, a bug may use symptoms defined using different data sources; this enables bugs to be defined for solutions that span multiple products.

A regular expression is entered in the Symptom Pattern field 606 to specify the symptom of interest. In some embodiments, parentheses may be used to save the text that matches the enclosed pattern so that it may be used to specify the pattern of another symptom. This "back reference" capability is described in greater detail below.

The Minimum and Maximum fields specify the number of times the pattern must be matched before the symptom is considered to have occurred. If not specified, at least 1 match must occur, i.e., the minimum is 1 and the maximum is any number. In the example shown, in FIG. 6A, only minimum field 608 has a value, in this case "1", and no frequency constraint (see "none" in Time Scope field 610), indicating that a single pattern match satisfies the symptom.

The Time Scope fields (a number and a unit) specify a time period in which the pattern must be matched before the symptom is considered to have occurred. If not specified, no time constraint is applied. If specified, the number of matches as specified by the minimum and maximum fields must occur within this time period before the symptom is considered to have occurred.

In the example shown in FIG. 6A, symptom 600 searches for at least 1 pattern match in the ddfs.info log. It may "capture" text that represents a source directory for a rename operation, e.g., by enclosing in parentheses text to be captured from matching logs, as described above. Referring to FIG. 6B, the symptom definition may refer to and substitute this captured text to specify its pattern. By using a back reference, symptom definition 620 effectively defines a separate pattern for every source directory found in the log data.

Referring further to FIG. 6B, the bug definition 620 includes a description 622 and includes additional fields that become available when a substitution, i.e., of data from a referenced symptom, is included in a symptom definition.

In the example shown, the String field 624 specifies a string to be used in the pattern to indicate a back reference. The first substitution string may default to $1, the string used in this example. However, if the pattern needed to find the text "$1" then an alternative substitution string could be specified.

The Substitution fields 626, 628, and 630 specify the information that should be used in place of the string when encountered in the pattern. There are multiple types of substitution but in this example, a back reference is indicated by selecting Reference from the dropdown list (626) and specifying a symptom number (628). The symptom number specified must contain a pattern with at least one set of parenthesis that "capture" matching text. Note that a pattern could have multiple sets of parentheses so the reference number indicates which one (its position within the pattern). If a mapping (630) was specified, the captured text would be mapped to another string before being substituted in the pattern.

Note that a pattern may specify back references from multiple symptoms. In some embodiments, if additional substitutions are defined, the second substitution string defaults to $2, the third to $3, and so on.

The pattern in symptom 620 contains the $1 substitution string, which in this example represents the source directory in a rename operation, specifically the source directory the name of which was captured in the referenced occurrence of symptom 600 of FIG. 6A. When at least 10 renames occur within a 5 minute period (specified by the minimum and time scope fields respectively), the symptom is considered to have occurred.

Figure 7:
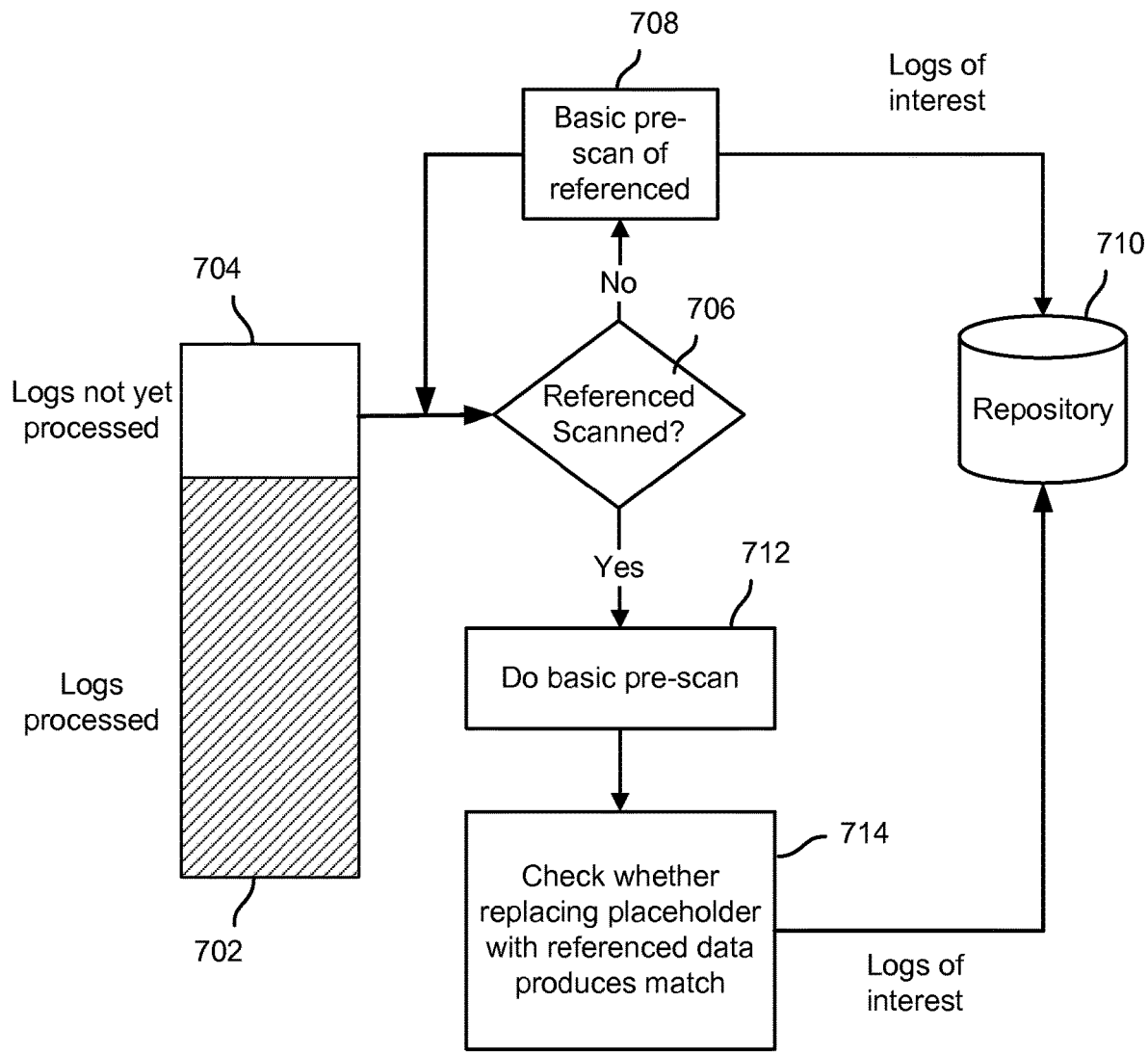
FIG. 7 is a block diagram illustrating an embodiment of a system to perform pre-scan for a symptom defined at least in part by a pattern that depends from a referenced symptom.

FIG. 7 is a block diagram illustrating an embodiment of a system to perform pre-scan for a symptom defined at least in part by a pattern that depends from a referenced symptom. In the example shown, a set of raw log data includes logs that have been pre-scanned previously 702 and logs that have not yet been pre-scanned 704. In processing a symptom that depends from one or more other symptoms, such as symptom 620 of FIG. 6B, it is determined at 706 whether the log being pre-scanned has already been pre-scanned for matches to the referenced symptom. If not, at 708 a basic (or less basic, if the referenced symptom itself references other symptoms) pre-scan is performed with respect to the log to pre-scan for occurrences of the referenced symptom. Any matches to the referenced symptom result in data comprising and/or identifying logs and/or portions thereof of interest being added to repository 710, and processing being returned to resume pre-scanning with respect to the symptom that includes the reference(s). Once any referenced symptom(s) has/have been pre-scanned (706), a basic pre-scan is performed to find potential matches for the pattern included in the definition of the symptom that references the referenced symptom (712), and for each potential match a check is performed to determine whether a complete match is found upon replacing a placeholder included in the pattern definition with a corresponding referenced data associated with a corresponding occurrence of the referenced symptom (714). For each match found after substituting data from the referenced symptom for the placeholder in the pattern definition of the symptom that references the referenced symptom, corresponding log data and/or associated (e.g., symptom match) metadata are stored in repository 710.

In some embodiments, processing similar to that described above in connection with FIG. 7 may be performed to pre-scan for a symptom that references and/or depends on other symptoms other than by including in a pattern that defines the symptom a placeholder that references data associated with a referenced symptom. For example, in the comparison-based symptom described above, in which the start time and end time of an operation are used to compute an elapsed time that is then compared to a threshold, a symptom associated with the threshold may reference other symptoms used to detect that the operation has started or stopped and/or to capture associated timestamps. In some embodiments, iterative pre-scan processing as shown in FIG. 7 may be used to pre-scan the referenced symptoms first, in this example the operation start and stop events, and then use pre-scan results associated with occurrences of the referenced symptoms to compute the elapsed time for purposes of pre-scanning for the elapsed time threshold comparison-based symptom.

Figure 8:
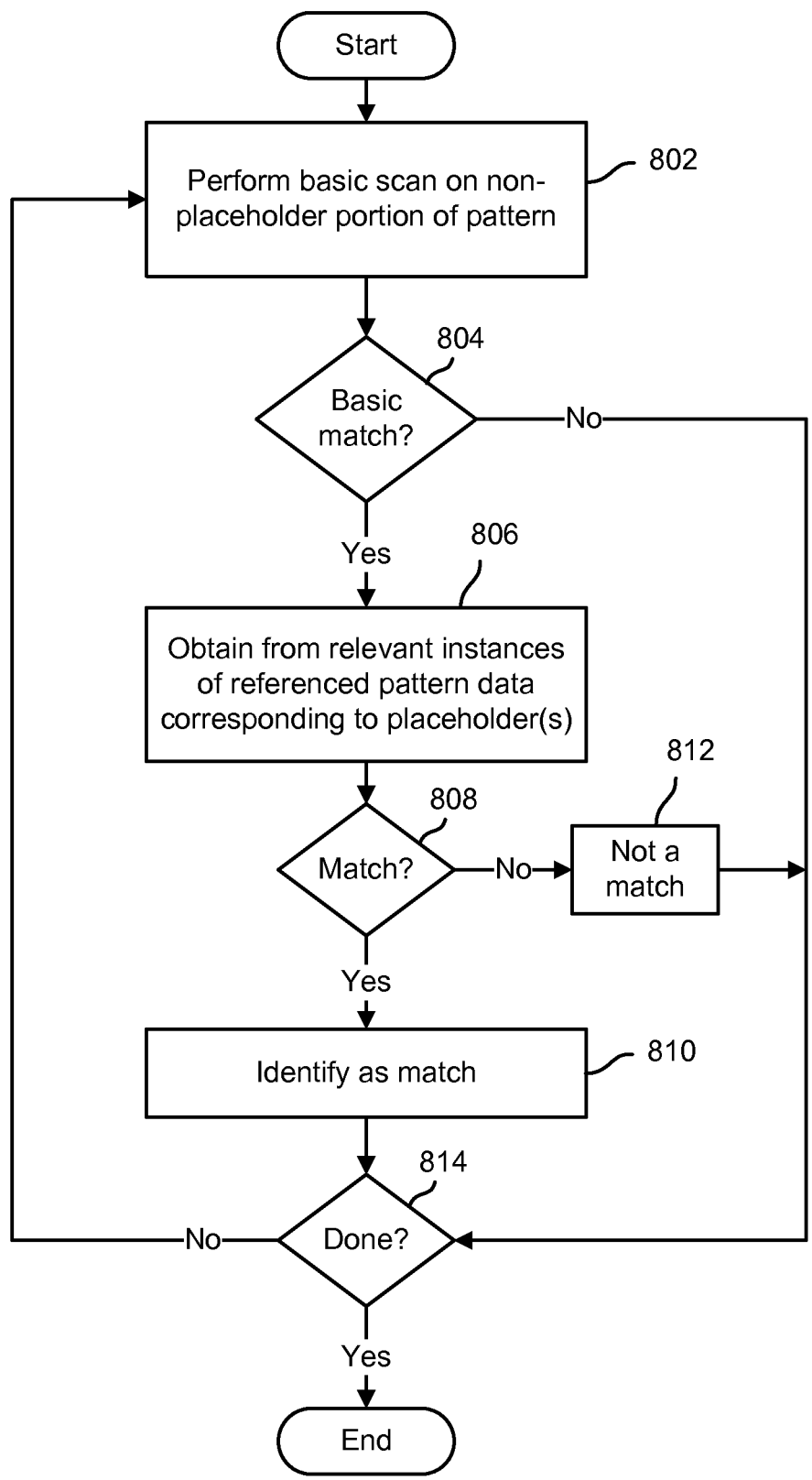
FIG. 8 is a flow chart illustrating an embodiment of a process to pre-scan logs.

FIG. 8 is a flow chart illustrating an embodiment of a process to pre-scan logs. In various embodiments, the process of FIG. 8 may be used to pre-scan for logs/entries that match a pattern that references another pattern, e.g., another symptom. In the example shown, a basic scan is performed with respect to a non-placeholder portion of a pattern (802). For example, assume that an advanced symptom A is defined as "$1: leave", where "$1" is the substitution of the first match of symptom B "(ioc\d+): enter". In this example, symptom A and symptom B can be used as a pair of "enter" and "leave" of a same device, in this case a "I/O controller" (or "ioc") corresponding to an identifier "d". In some embodiments, step 802 would include in a pre-scan for symptom A performing a basic scan for the non-placeholder portion of the regular expression used to express the pattern used to define symptom A, in this case the string "leave" (or, ": leave"). If a basic match is found (804), referenced data associated with the placeholder is obtained (806). For example, pre-scan result data associated with symptom B with respect to the same device/system, for example, may be retrieved and the data enclosed in parentheses in the above pattern associated with symptom B, specifically "ioc\d", which may, for example, include a reference to a particular I/O controller, such as ioc1, may be determined and used to further evaluation symptom A. If upon replacing the placeholder data of the symptom currently being evaluated with corresponding data from an occurrence of a referenced symptom a match of other symptom and/or symptom set detection criteria is determined to have been met (808), the associated log or portion thereof is identify as a match (810) and pre-scan result data is stored. If the symptom or symptom set detection criteria is not met (808), no match is determined to have been found (812) and pre-scanning of other, not yet scanned logs and/or portions thereof resumes until all logs have been pre-scanned or the process otherwise ends (814).

Figure 9:
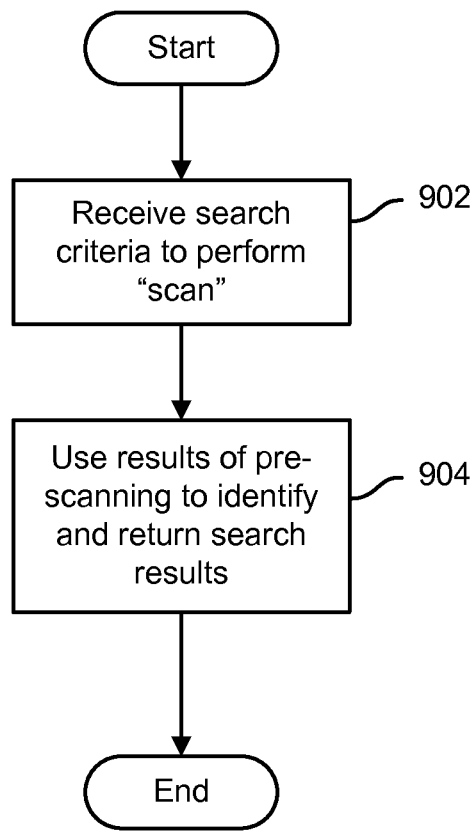
FIG. 9 is a flow chart illustrating an embodiment of a process respond to a scan request or other search query.

FIG. 9 is a flow chart illustrating an embodiment of a process respond to a scan request or other search query. In various embodiments, pre-scan results determined as disclosed herein may be used at scan/search time to identify quickly logs and portions thereof that are responsive to scan/search queries. In the example shown, search or scan criteria are received (902). For example, a search/scan may be requested to identify logs in which symptom A in the example above occurred within a prescribed time of a corresponding occurrence of symptom B; or, logs in which symptom A occurred without a corresponding occurrence of symptom B within a prescribed time before; etc. The results of pre-scanning for patterns and/or symptoms as disclosed herein are used to identify and return results (904). For example, pre-scan results stored in a repository, such as repository 408 of FIG. 4 or repository 710 of FIG. 7, may be searched to identify logs or portions thereof that satisfy the search query.

In various embodiments, writing pre-scan results to a database or other data store may be optimized by writing results to a file first and then uploading the results to a database in bulk. Uploading millions of rows that match the pattern into database directly may be time consuming and inefficient. Many database systems, e.g., Greenplum™, support uploading data via external tables. In some embodiments, in the course of pre-scan processing, once matched logs are identified they can be written into a file first and later upload to the database by external tables.

In some embodiments, if the raw log entries are stored in database a huge table may be required, for example, on the order of ten billion rows. In order to improve performance of incremental pre-scan as disclosed herein, in some embodiments, a partition on log id or some other incrementally increased field may be used to improve performance.

In some embodiments, a database table of pre-scan results may be partitioned to improve performance. A big system may have hundreds of patterns. Some of them may have tens of millions of matches. To manage such big result in either file or database, pre-scan results may be partitioned. In various embodiments, the partition may be built on pattern ID or some other attribute. Most databases support partition. For files, different partitions can be represented as separate files.

In some embodiments, when a symptom or symptom set definition is updated and/or a new symptom and/or symptom set is created a full scan is performed of raw log data that has been pre-scanned prior to the update. In some embodiments, the full scan is performed with respect to the new and/or updated definitions. As matches are found, corresponding pre-scan results are generated and added to the pre-scan results database.

In some embodiments, when a pattern is updated or deleted, e.g., by an administrator or other user, the old results of matches may no longer be useful. In some embodiments, however, pre-scan results associated with superseded patterns may not be deleted immediately. In some embodiments, a tag may be added to the old results or the partition. A garbage collection process is used to delete the obsolete results asynchronously. The garbage collection can be scheduled to occur during otherwise idle periods to balance resource consumption.

In various embodiments, pattern and symptom pre-scan techniques disclosed herein may enable logs or portions thereof that match symptoms and/or symptom sets to be identified quickly at scan/search time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   pre-scanning, by one or more processors, a plurality of logs incrementally to identify a set of the plurality of logs corresponding to logs of interest, wherein a log of the plurality of logs is identified as a log of interest based at least in part on a determination that the log satisfies a symptom definition associated with a symptom, the symptom definition comprises a structure of a pattern of the symptom and placeholder data of the symptom, and the pre-scanning the plurality of logs comprises:
   respectively performing a basic scan to determine whether one of the plurality of logs comprise a basic match based at least in part on data comprised in the one of the plurality of logs and the structure of the pattern of the symptom; and
   in response to a determination that the one of the plurality of logs comprises a basic match, determining whether the data comprised in the one of the plurality of logs matches the symptom based at least in part on the pattern of the symptom and the placeholder data of the symptom;
   in response to a determination that the data comprised in the one of the plurality of logs matches the symptom, generating, by one or more processors, a symptom pre-scan result for those logs of interest that satisfy the symptom definition; and
   storing, by one or more processors, the symptom pre-scan result in a searchable pre-scan result data store, wherein the storing the symptom pre-scan result comprises building a partition with respect to the plurality of logs, and the partition is built based at least in part on information identifying the pattern of the symptom.

2. The method of claim 1, wherein pre-scanning includes applying to one or more logs of interest identified through said pre-scanning a frequency constraint associated with the symptom.

3. The method of claim 2, wherein the frequency constraint indicates a threshold number of occurrence of the pattern and a period of time within which the threshold number of occurrences of the pattern must have occurred to satisfy the frequency constraint.

4. The method of claim 1, wherein pre-scanning logs incrementally includes pre-scanning a first set of logs; marking the first set of logs as having been pre-scanned; and pre-scanning a second set of logs that have not yet been pre-scanned, based at least in part on a determination that the first set of logs has already been pre-scanned.

5. The method of claim 4, wherein marking the first set of logs as having been pre-scanned includes using a pointer or other data structure to indicate within a set of raw log data a last log that has been pre-scanned.

6. The method of claim 1, wherein the symptom definition comprises pattern expressed as a regular expression.

7. The method of claim 6, wherein the pattern comprises a first pattern and the first pattern references a second pattern.

8. The method of claim 7, wherein a placeholder value included in the first pattern is associated, in a definition with which the first pattern is associated, with corresponding data associated with a corresponding occurrence of the second pattern.

9. The method of claim 8, wherein finding a match of the first pattern includes performing the basic scan to find a basic match of a non-placeholder portion of the first pattern; obtaining from the corresponding occurrence of the second pattern said corresponding data; substituting the corresponding data for the placeholder in the first pattern; and determining based on the result that a match of the first pattern has been found.

10. The method of claim 1, further comprising receiving a search query that includes the symptom as a query term, and using a stored set of symptom pre-scan results to find logs or portions thereof that are responsive to the query.

11. The method of claim 1, wherein the pre-scan result includes one or more entries identifying at least one of the set of the plurality of logs corresponding to logs of interest.

12. The method of claim 1, wherein the pre-scan results are stored in a manner that identifies the set of the plurality of logs corresponding to logs of interest.

13. The method in claim 1, further comprising:
   performing a check against the symptom pre-scan result to determine logs of the set of the plurality of logs correspond to logs of interest that are a complete match with respect to the referenced symptom.

14. The method of claim 1, further comprising:
   processing at least one log of interest of the set of the plurality logs corresponding to logs of interest, the processing comprising determining whether the at least one log of interest matches at least one predefined symptom.

15. The method of claim 14, wherein the determining whether the at least one log of interest matches at least one predefined symptom comprises determining whether the at least one log of interest satisfies a hierarchy of a plurality of predefined symptoms.

16. The method of claim 1, further including determining that the basic match exists between data comprised in the plurality of logs and the pattern of the symptom based on a determination that the data comprised in the plurality of logs is consistent with the pattern of the symptom, wherein the determining that the basic match exists is different from the determining whether the data comprised in the one of the plurality of logs matches the symptom based at least in part on the pattern of the symptom and the placeholder data of the symptom.

17. The method of claim 1, further comprising:
receiving, by the one or more processors, a query comprising one or more criteria for identifying logs with respect to one or more predefined symptoms; and
in response to receiving the query, determining whether the pre-scan result data store comprises any logs satisfying the one or more criteria of the query.

18. A system, comprising:
a data storage device; and
one or more processors coupled to the data storage device and configured to:
pre-scan a plurality of logs incrementally to identify a set of the plurality of logs corresponding to logs of interest, wherein a log of the plurality of logs is identified as a log of interest based at least in part on a determination that the log satisfies a symptom definition associated with a symptom, the symptom definition comprises a structure of a pattern of the symptom and placeholder data of the symptom, and the pre-scanning the plurality of logs comprises:
respectively perform a basic scan to determine whether one of the plurality of logs comprise a basic match based at least in part on data comprised in the one of the plurality of logs and the structure of the pattern of the symptom; and
in response to a determination that the one of the plurality of logs comprises a basic match, determine whether the data comprised in the one of the plurality of logs matches the symptom based at least in part on the pattern of the symptom and the placeholder data of the symptom;
in response to a determination that the data comprised in the one of the plurality of logs matches the symptom, generate a symptom pre-scan result for those logs of interest that satisfy the symptom definition; and
store the symptom pre-scan result in a searchable pre-scan result data store on the data storage device, wherein to store the symptom pre-scan result comprises building a partition with respect to the plurality of logs, and the partition is built based at least in part on information identifying the pattern of the symptom.

19. The system of claim 18, wherein pre-scanning includes applying to one or more logs of interest identified through said pre-scanning a frequency constraint associated with the symptom.

20. The system of claim 19, wherein the frequency constraint indicates a threshold number of occurrence of the pattern and a period of time within which the threshold number of occurrences of the pattern must have occurred to satisfy the frequency constraint.

21. The system of claim 18, wherein pre-scanning logs incrementally includes pre-scanning a first set of logs; marking the first set of logs as having been pre-scanned; and pre-scanning a second set of logs that have not yet been pre-scanned, based at least in part on a determination that the first set of logs has already been pre-scanned.

22. The system of claim 21, wherein marking the first set of logs as having been pre-scanned includes using a pointer or other data structure to indicate within a set of raw log data a last log that has been pre-scanned.

23. The system of claim 18, wherein the symptom definition comprises pattern expressed as a regular expression.

24. The system of claim 23, wherein the pattern comprises a first pattern and the first pattern references a second pattern.

25. The system of claim 24, wherein a placeholder value included in the first pattern is associated, in a definition with which the first pattern is associated, with corresponding data associated with a corresponding occurrence of the second pattern.

26. A computer program product, the computer program product being embodied in a non-transitory computer readable storage medium and comprising computer instructions for:
pre-scanning, by one or more processors, a plurality of logs incrementally to identify a set of the plurality of logs corresponding to logs of interest, wherein a log of the plurality of logs is identified as a log of interest based at least in part on a determination that the log satisfies a symptom definition associated with a symptom, the symptom definition comprises a structure of a pattern of the symptom and placeholder data of the symptom, and the pre-scanning the plurality of logs comprises:
respectively performing a basic scan to determine whether one of the plurality of logs comprise a basic match based at least in part on data comprised in the one of the plurality of logs and the structure of the pattern of the symptom; and
in response to a determination that the one of the plurality of logs comprises a basic match, determining whether the data comprised in the one of the plurality of logs matches the symptom based at least in part on the pattern of the symptom and the placeholder data of the symptom;
in response to a determination that the data comprised in the one of the plurality of logs matches the symptom, generating, by one or more processors, a symptom pre-scan result for those logs of interest that satisfy the symptom definition; and
storing, by one or more processors, the symptom pre-scan result in a searchable pre-scan result data store, wherein the storing the symptom pre-scan result comprises building a partition with respect to the plurality of logs, and the partition is built based at least in part on information identifying the pattern of the symptom.

27. The computer program product of claim 26, wherein pre-scanning logs incrementally includes pre-scanning a first set of logs; marking the first set of logs as having been pre-scanned; and pre-scanning a second set of logs that have not yet been pre-scanned, based at least in part on a determination that the first set of logs has already been pre-scanned.

* * * * *